United States Patent
Johansson

(10) Patent No.: US 7,809,462 B2
(45) Date of Patent: Oct. 5, 2010

(54) POWER SAVINGS METHOD FOR ROTATING PULP AND PAPER MACHINERY

(76) Inventor: Ola M. Johansson, 2490 Whipple Tree La., Brookfield, WI (US) 53045

( * ) Notice: Subject to any disclaimer, the term of this patent is extended or adjusted under 35 U.S.C. 154(b) by 351 days.

(21) Appl. No.: 11/749,541

(22) Filed: May 16, 2007

(65) Prior Publication Data
US 2008/0288090 A1    Nov. 20, 2008

(51) Int. Cl.
*G06F 7/66*     (2006.01)
*D21F 7/02*     (2006.01)

(52) U.S. Cl. .................. 700/128; 700/129; 162/198; 162/262

(58) Field of Classification Search .............. 700/28, 700/127, 128, 170; 702/43, 81, 155, 156, 702/158; 162/197, 198, 202, 232, 252, 262, 162/263; 19/65 A, 98, 144; 241/28, 33, 241/34, 36
See application file for complete search history.

(56) References Cited

U.S. PATENT DOCUMENTS

| | | | | |
|---|---|---|---|---|
| 4,243,482 A | * | 1/1981 | Seppanen | 162/202 |
| 4,258,613 A | * | 3/1981 | Fegley et al. | 493/22 |
| 4,306,934 A | * | 12/1981 | Seppanen | 162/209 |
| 4,661,911 A | | 4/1987 | Ellery, Sr. | 364/471 |
| 5,450,777 A | | 9/1995 | Molnar et al. | 83/98 |
| 5,930,870 A | * | 8/1999 | Leifeld et al. | 19/105 |
| 5,974,629 A | * | 11/1999 | Leifeld et al. | 19/98 |
| 6,302,996 B1 | * | 10/2001 | Juutinen | 162/60 |
| 6,336,602 B1 | * | 1/2002 | Miles | 241/28 |
| 7,067,039 B2 | * | 6/2006 | Almi et al. | 162/193 |
| 7,093,325 B2 | * | 8/2006 | Breuer et al. | 19/65 A |
| 7,123,987 B2 | * | 10/2006 | Okamoto et al. | 700/213 |
| 2003/0155395 A1 | * | 8/2003 | Almi et al. | 226/24 |
| 2004/0177479 A1 | * | 9/2004 | Breuer et al. | 19/65 A |

FOREIGN PATENT DOCUMENTS

JP    2006063490 A    *    3/2006

* cited by examiner

*Primary Examiner*—Charles R Kasenge
(74) *Attorney, Agent, or Firm*—Donald J. Ersler

(57) ABSTRACT

A power saving method for rotating pulp and paper machinery includes a fiber quality measurement device, a control system and a variable speed drive. The power savings method is applied to either fiber refiners or pressurized screens. Pulp stock enters a rotating machine, which is driven by an electric motor. The electric motor receives electrical current from the variable speed drive to implement rotation. The variable speed drive changes a frequency of the electrical current according to input received by the control system. The control system includes a control algorithm to optimize the efficiency of the rotating machine. The control system receives inputs of pressures, flows, consistency and position. The control system also receives input from the pulp quality measurement device. The algorithm calculates the process values and input from the pulp quality measurement device to determine the appropriate electrical current frequency to output to the electric motor.

13 Claims, 11 Drawing Sheets

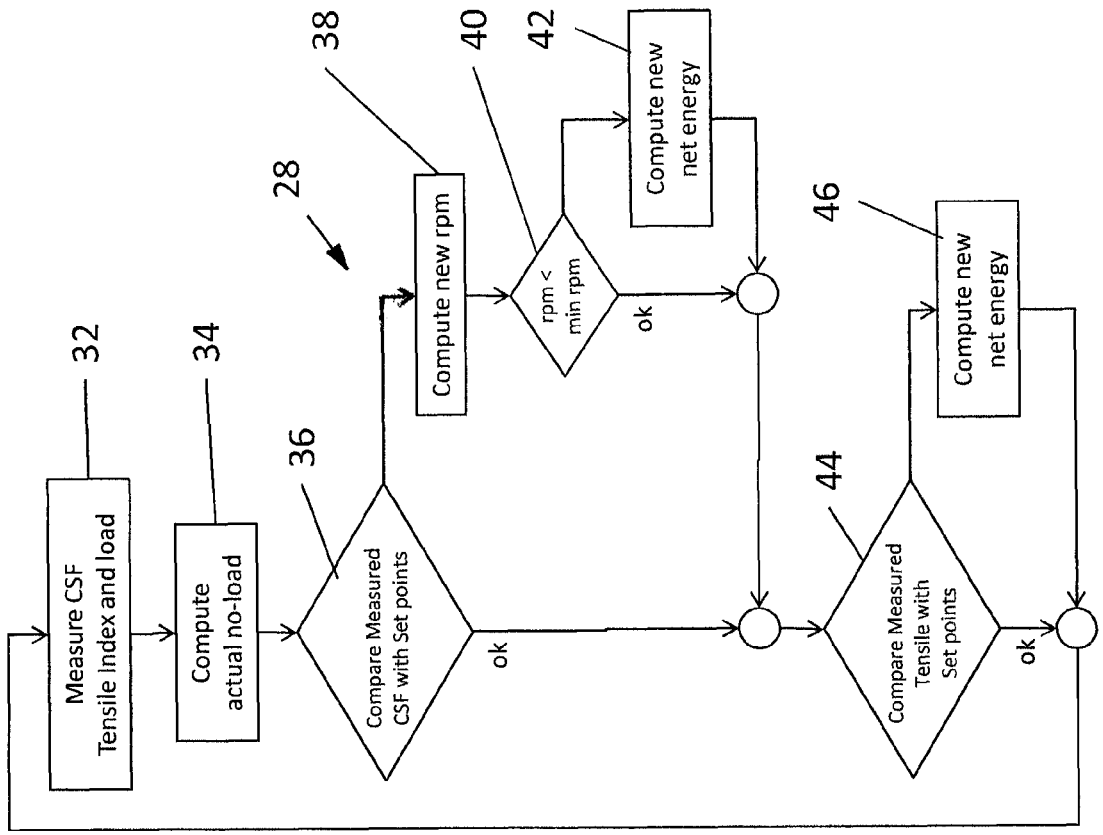

Figure 3

```
csfdrop=csf(1)+csf(2)*intensity+csf(3)*netsec;
acsf=incsf-csfdrop;
tenimp=ten(1)+ten(2)*intensity+ten(3)*netsec
aten=inten+tenimp;
noload=0.746*102*(rpm/100)^3*(42/100)^4.3;
if(t>100)
errcsf=acsf-spcsf;
if(abs(errcsf) > tolcsf)
  % correct the csf
  reqcsfdrop=errcsf/100+csfdrop;
  reqint=(reqcsfdrop-csf(1)-csf(3)*netsec)/csf(2);
  deltarpm=netload*60/(70*reqint)-rpm;
  rpm=rpm+deltarpm/2;
  % correct the sec if rpm is below min, ie max sel
  if(rpm < 300)
    netsec=netsec+.1;
    netload=netsec*(500/24);
  end
end
% clamp the rpm
if(rpm <300) rpm=300; end
if(rpm >550) rpm=550; end
netsec=netload/(500/24);
intensity=netload/(70*rpm/60);
tenimp=ten(1)+ten(2)*intensity+ten(3)*netsec
aten=inten+tenimp;
erten=spten-aten;
if(abs(errten) > tolten)
  % correct the tensile index
  reqten=errten/10+tenimp;
  reqsec=(reqten-ten(1)-ten(2)*intensity)/ten(3);
  deltasec=reqsec-netsec;
  netsec=netsec+deltasec/2;
  netload=reqsec*(500/24);
  % correct the tensile index by adjusting energy
end
end
% actual quality data
csfdrop=pvcsf;
acsf=incsf-csfdrop;
tenimp=pvtensile
```

Figure 3a

POWER SAVINGS METHOD FOR ROTATING PULP AND PAPER MACHINERY

BACKGROUND OF THE INVENTION

1. Field of the Invention

The present invention relates generally to energy conservation and more specifically to a power savings method for rotating pulp and paper machinery, which reduces the rotational speed of a motor, while maintaining a minimum standard of quality.

2. Discussion of the Prior Art

The pulp and paper industry is in desperate need of reducing its energy consumption as the cost of electrical energy is increasing, and the value of the produced paper products is reduced. In most pulp and paper processes, fibers are transported and developed in dilute suspension, in the range of 2-10% of solids, with 90-98% water. For years, optimizations and control strategies have been implemented on pumps and control valves in order to reduce the energy requirements for the transport of the material through the different stages in the process. However, very little has been done for the process equipment that develops the physical properties of the fibrous material. This is primarily due to the fact, that until recently, the cost of electrical energy has been a relatively small part of the production cost. The development of the fibers occurs in rotating machinery such as refiners and pressurized screens. The refiners mechanically work the fibers to make them more flexible, as well as developing the surface area. Pulp stock is passed through a barrier in the pressurized screen to sort out fibers that are not within a certain size and flexibility specification. In addition, any contaminants such as dirt, ink, coarse fibers, stickies etc are transferred to a reject stream for additional processing. Refiners and pressurized screens are both rotating machinery, and a significant portion of the applied power is wasted in terms of a so called no-load. This load is caused by the viscous drag effects as the rotating refiner discs or screen rotor is rotating in the water suspension. Pump theory as well as professional literature show that the no-load is strongly dependent on the diameter of the rotating assembly as well as the rotational speed as illustrated in equation 1.

$$\text{No-load} = k * D^{4.3} * w^3 \quad (1)$$

Where D is the diameter and w is the rotational speed. The refiners and pressurized screens are connected to synchronized electrical motors, which means that the rotational speed is fixed in increments of the line frequency. For example a 6 pole motor feed with 60 Hz line current will operate at $$Ns = 120 * f/p = 120 * 60/6 = 1200 \text{ rpm} \quad (2)$$

Similarly at 9 poles the synchronous speed will be 800 rpm. With a fixed operational speed, there is always a compromise, since the conditions of the fibers entering the refiners or screens are changing all the time. As a consequence, the rotational speed is always high in order to ensure that the equipment can handle the most extreme fiber conditions, and as a consequence the no-load power use is higher than it needs to be. A graph illustrating no load as a function of rotational speed for two typical refiner diameters is shown in FIG. 1.

U.S. Pat. No. 4,661,911 to Ellery, Sr. discloses an adaptive constant refiner intensity control. The Ellery, Sr. patent includes a method and an apparatus for maintaining a constant refining intensity under varying tonnage rate and applied power conditions to a slurry of paper stock being passed through a disk type refiner.

U.S. Pat. No. 5,450,777 to Molnar et al. discloses a method and apparatus for processing chopped fibers from continuous tows. The Molnar et al. patent includes an apparatus for processing chopped fibers. The apparatus includes sensors for monitoring the movement of each of the tows to the pump and cutter mechanism, and a controller, which adjusts the feed rate of the tows.

U.S. Pat. No. 6,336,602 to Miles discloses a low speed low intensity chip refining (in a steam phase, not in water). The Miles patent includes mechanical refining of wood chips. Wood pulp quality is improved by employing low refining intensity at least in a final refining stage. The refining is carried out at rotational speeds that are lower than those conventionally employed. However, it should be noted that this work relates to the net energy inputted into the fibers and not to no-load energy.

Accordingly, there is a clearly felt need in the art for a power savings method for rotating pulp and paper machinery, which reduces the rotational speed of a motor and proportionally reduces the amount of energy consumption, while maintaining a minimum standard of pulp quality.

SUMMARY OF THE INVENTION

The present invention provides a power savings method for rotating pulp and paper machinery, which reduces the rotational speed of a motor to reduce energy consumption from the no-load portion of the applied power, and not from the net energy applied to the material. The power saving method for rotating pulp and paper machinery (power savings method) includes a pulp quality measurement device, a control system and a variable speed drive. The power savings method may be applied to two types of rotating machinery. The two types of rotating machinery are fiber refiners and pressurized screens for paper pulp. Pulp stock enters a rotating machine, which is driven by an electric motor. The electric motor receives an output of electrical current from the variable speed drive to implement rotation.

The variable speed drive changes a frequency of the electrical current according to input received by the control system. The control system is preferably a microprocessor based board. The control system includes a control algorithm to optimize the efficiency of the rotating machine. The control system receives inputs of process values, such as pressures, flows, consistency and position. The control system also receives input from the pulp quality measurement device. The algorithm calculates the process values and input from the pulp quality measurement device to determine the appropriate frequency of electrical current for the electric motor of the rotating machine.

Accordingly, it is an object of the present invention to provide a power savings method, which reduces the rotational speed of a motor and proportionally reduces the amount of energy consumption by the change in rotational speed raised to the third power, while maintaining a minimum standard of pulp quality.

Finally, it is another object of the present invention to provide a power savings method, which reduces the rotational speed of a motor to reduce energy consumption from the no-load portion of the applied power, and not from the net energy applied to the material.

BRIEF DESCRIPTION OF THE DRAWINGS

FIG. 3 is a flow chart of a control algorithm of a power savings method in accordance with the present invention.

FIG. 3a is a program routine of a control algorithm of a power savings method in accordance with the present invention.

DETAILED DESCRIPTION OF THE PREFERRED EMBODIMENTS

Figure 1:
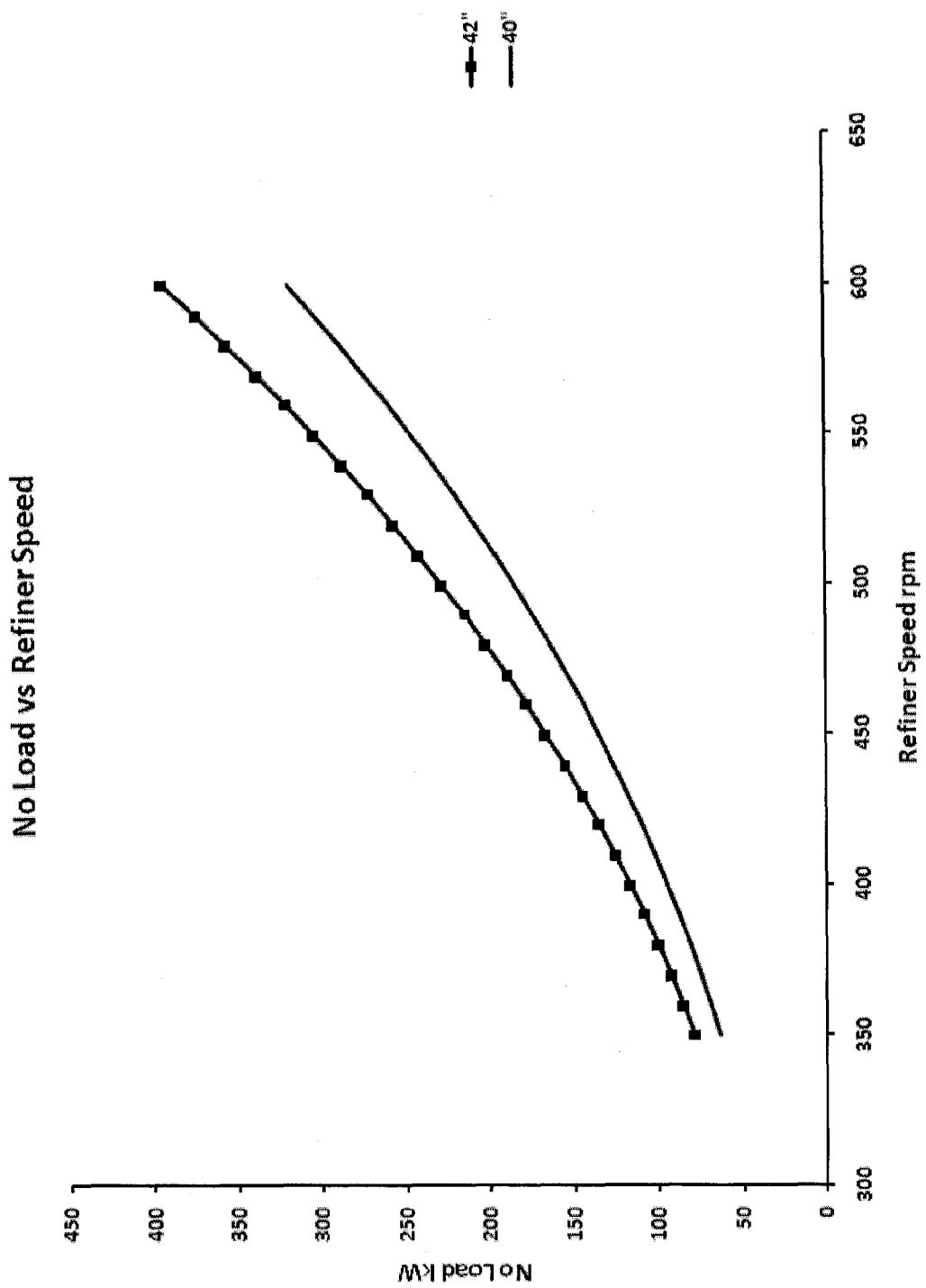
FIG. 1 is a graph illustrating no-load as a function of rotational speed for two typical refiner diameters.
Figure 2:
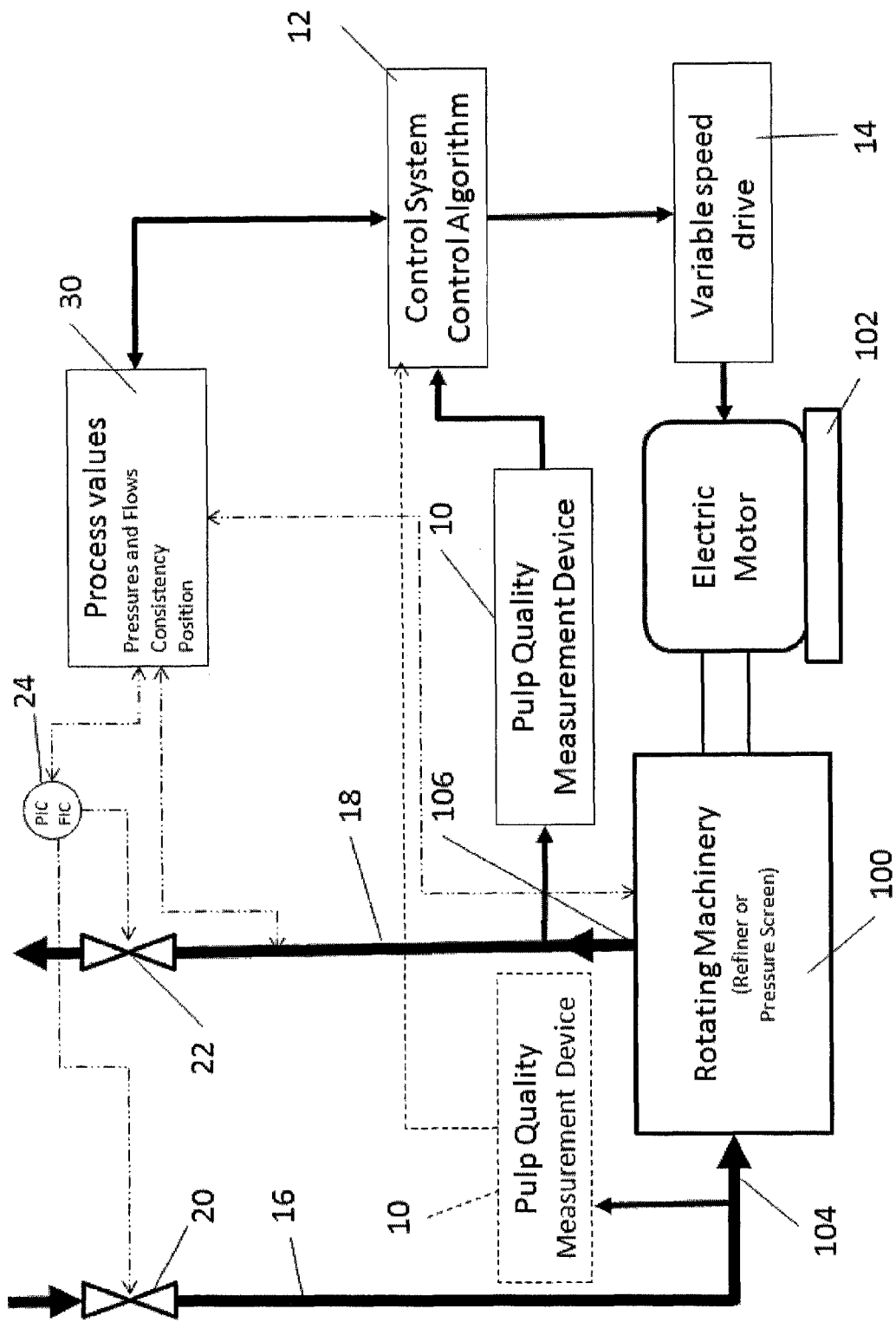
FIG. 2 is a block diagram of a power savings method in accordance with the present invention.

With reference now to the drawings, and particularly to FIG. 2, there is shown a block diagram of a power savings method. The power savings method includes a pulp quality measurement device 10, a control system 12 and a variable speed drive 14. The power savings method may be applied to two types of rotating machinery. The two types of rotating machinery are fiber refiners and pressurized screens for paper pulp. Pulp stock enters a rotating machine 100 through an inlet 104 from an inlet pulp stream 16 and exits through an outlet 106 into an outlet pulp stream 18. The pulp quality measurement device 10 is preferably connected to the outlet stream 18, but could be connected to the inlet stream 16. The pulp quality measurement device 10 outputs physical properties, such as freeness, tensile index, shive values, fiber lengths, surface area and other geometric parameters. Pulp quality measurement devices are well known in the art and need not be explained in detail.

Flow in the inlet pulp stream 16 is regulated with an inlet control valve 20. Flow in the outlet pulp stream 18 is regulated with an outlet control valve 22. A pressure/flow controller 24 opens and closes the inlet and outlet control valves. The rotating machine 100 is driven by an electric motor 102. The electric motor 102 receives electrical current from the variable speed drive 14 to implement rotation. The variable speed drive 14 changes a frequency of the electrical current according to input received by the control system 12. Variable speed drives are well known in the art and need not be explained in detail. The control system 12 is preferably a microprocessor based board.

With reference to FIG. 3, the control system 12 includes a control algorithm 28 to optimize the efficiency of the rotating machine 100 by reducing the amount of electrical power consumed by the rotating machine 100. The control algorithm 28 is based on experimental data obtained through refiner trials. The control algorithm 28 compares measured pulp properties with set-points entered into the control system by the operator. If the quality of the pulp is within specification, the control algorithm 28 reduces the rotational speed of the electric motor 102 through the variable speed drive 14 by reducing the frequency of the electrical current to the electric motor 102. The rotational speed of the electric motor 102 is reduced, until the pulp quality is on the verge of exceeding the set point values, or if limits of process values 30 are met. The process values 30 are provided through a plurality of instruments that measure the values of pressure, flow, consistency and position. Alternatively, if pulp quality is exceeds the values set by the operator, the control algorithm first adjusts the process values 30, until the pulp quality measurement(s) indicates that the pulp quality is within specification. Then if necessary, the control algorithm 28 adjusts the rotational speed of the electric motor 102 for minimal no-load conditions.

By performing a trial where the net specific energy and intensity is varied in a controlled way, and by measuring the resulting pulp quality, control equations can easily be developed using multiple linear regression or any other appropriate method.

It is well established in professional literature that pulp quality development over a refiner depends on how much net energy is applied (net specific energy kWh/ton) and at what refining intensity (SEL Ws/m). By performing a trial where the net specific energy and intensity is varied in a controlled way, and by measuring the resulting pulp quality, control equations can easily be developed using multiple linear regression. The Net Specific Energy (SEC) is calculated as follows:

Net Specific Energy=(Total Applied Power−No-load)/Weight

Refining intensity (SEL) is calculated as follows:

$$SEL = \frac{\text{Net Specific Energy}}{\left(\frac{\text{refiner plate edge length} *}{\text{angular velocity refiner plates}}\right)}$$

Canadian Standard Freeness (CSF) is calculated as follows:

CSF=a+b*SEC+c*SEL

Tensile Index is calculated as follows:

Tensile Index=d+e*SEC+f*SEL

Figure 4:
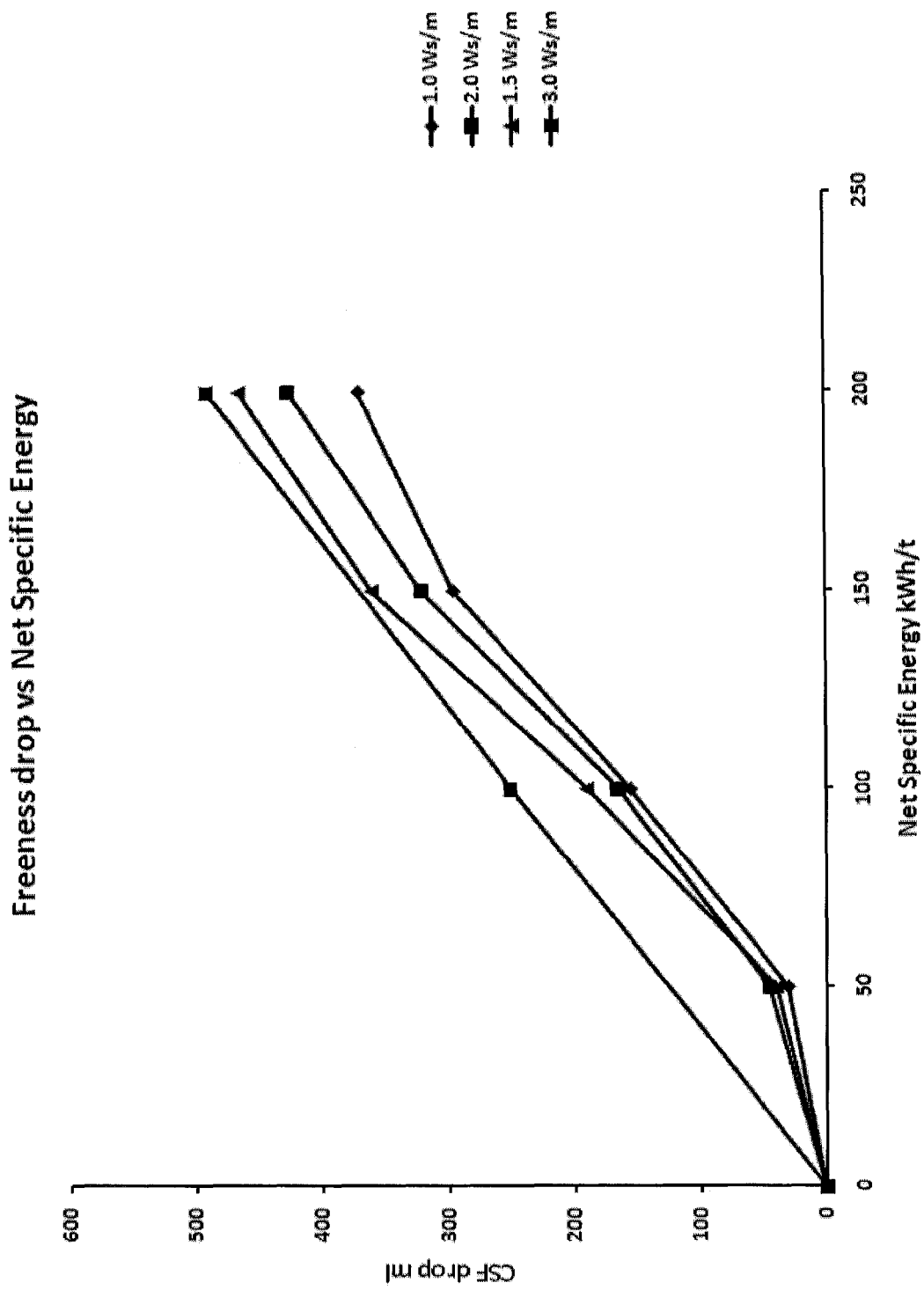
FIG. 4 is a graph illustrating freeness drop vs net specific energy.
Figure 5:
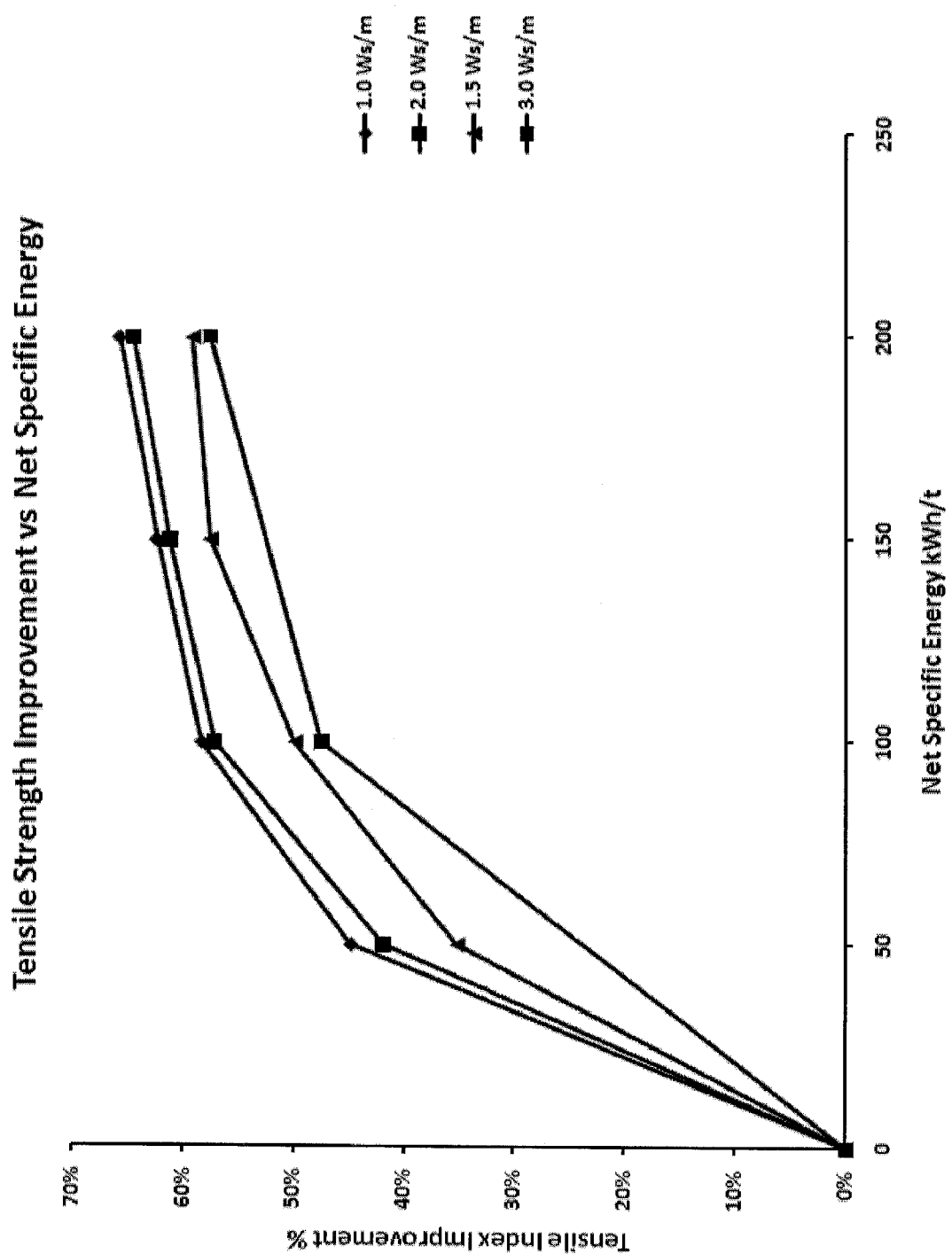
FIG. 5 is a graph illustrating tensile strength improvement vs net specific energy.
Figure 6:
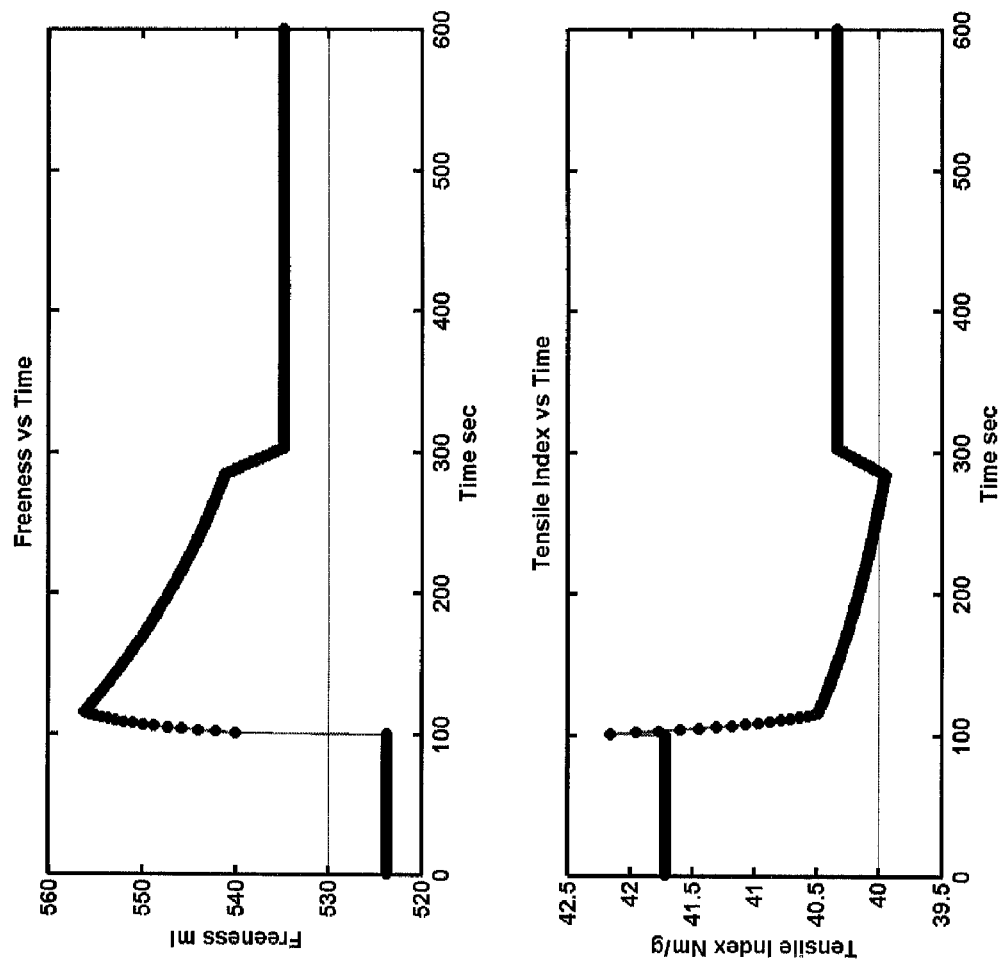
FIG. 6 is a graph illustrating tensile index vs time aligned with a graph illustrating freeness vs time.
Figure 7:
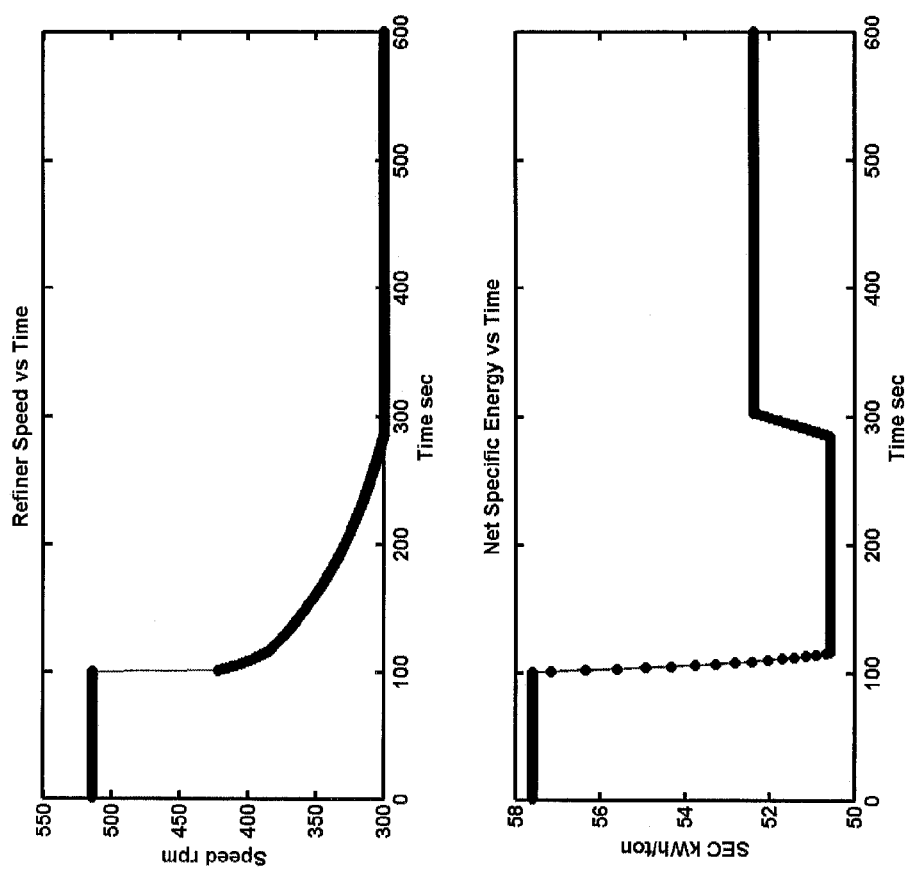
FIG. 7 is a graph illustrating net specific energy vs time aligned with a graph illustrating refiner speed vs time.
Figure 8:
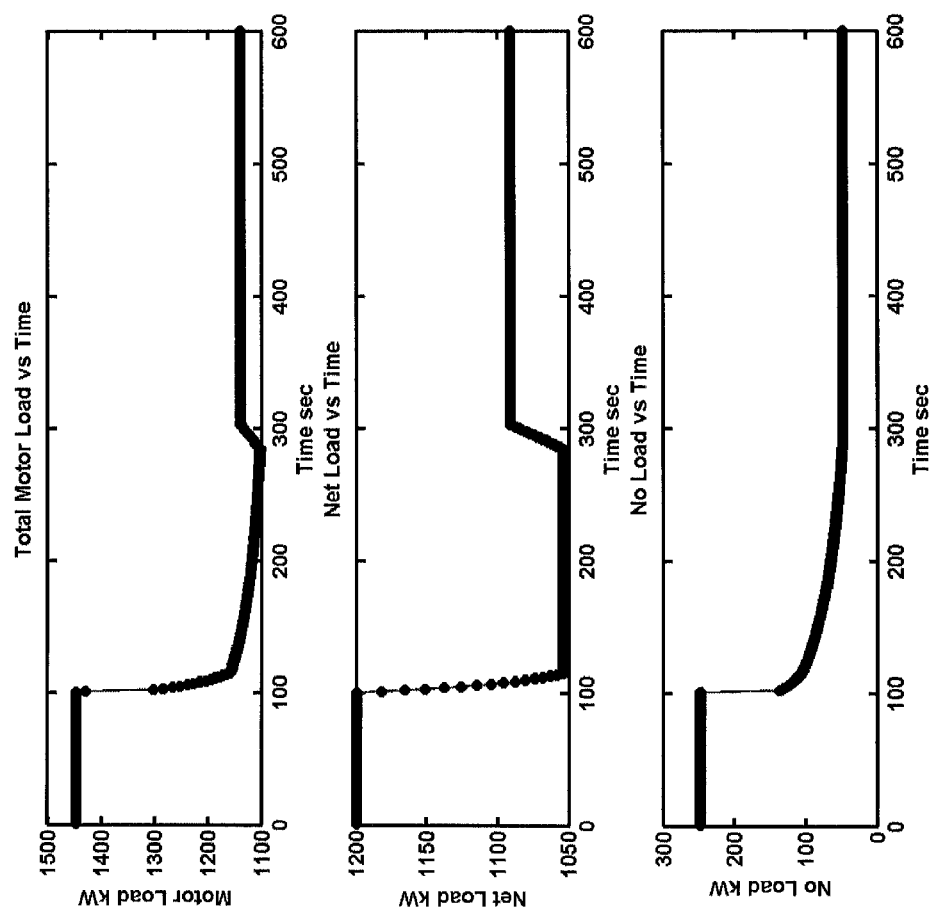
FIG. 8 is a graph illustrating no-load vs time aligned with a graph illustrating net load vs time and total motor load vs time.
Figure 9:
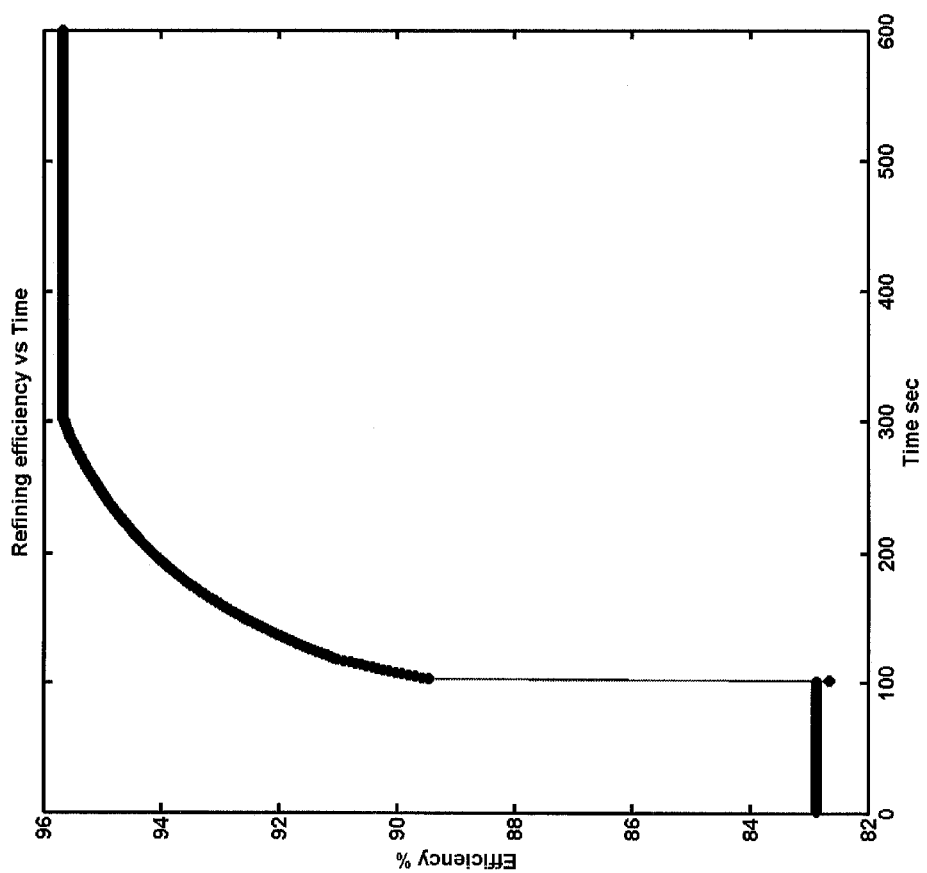
FIG. 9 is a graph illustrating refining efficiency vs time.
Figure 10:
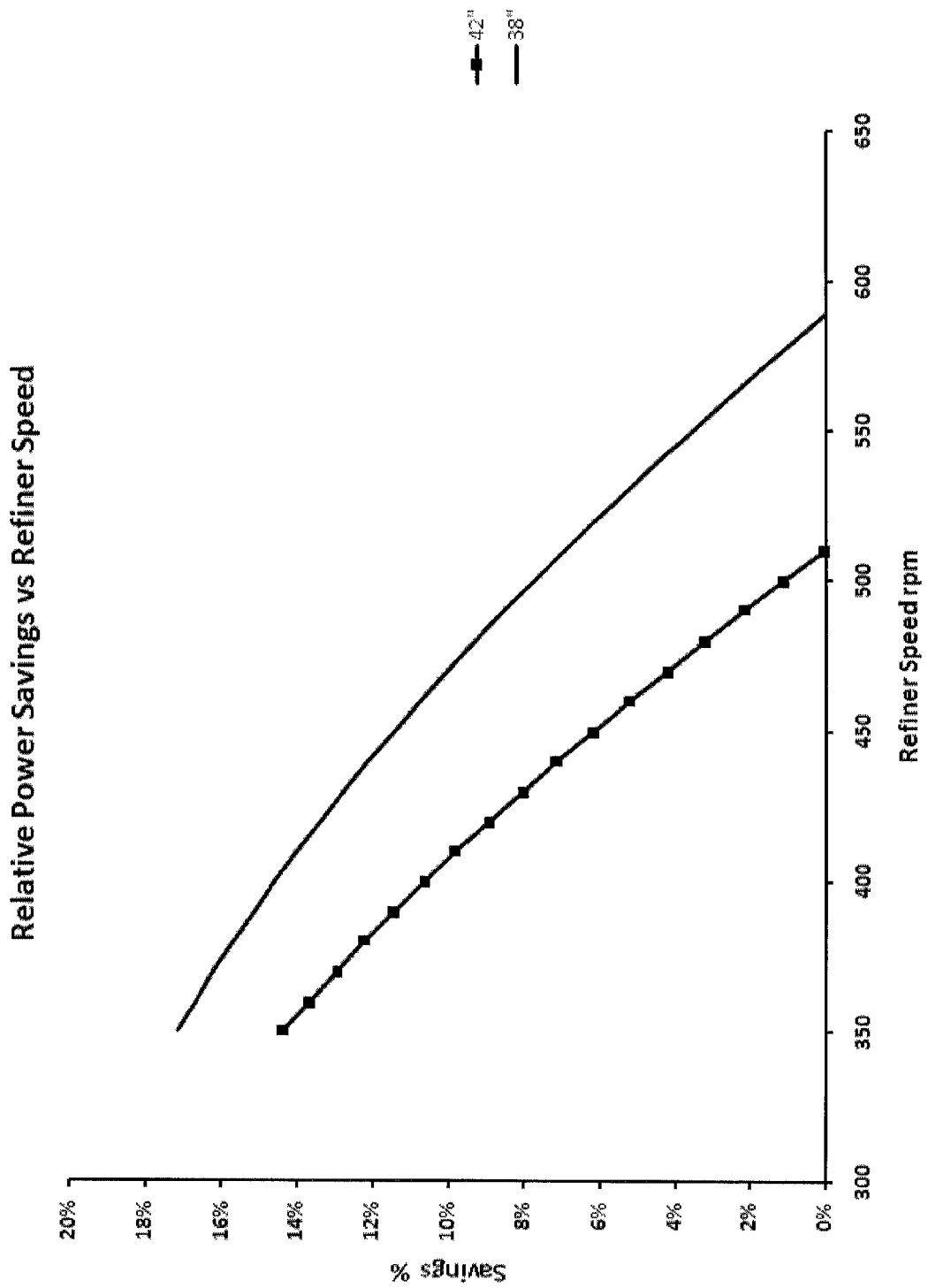
FIG. 10 is a graph illustrating relative power savings vs refiner speed.

However, the constants a-f are undefined. The constants a-f can be determined by using multiple linear regressions. FIGS. 4-5 show a typical example of drainage and strength development over a low consistency refiner as a function of applied net energy and refining intensity. The relationship between the Tensile Index and The CSF can be used to establish constants a, b, c, d, e and f. FIG. 4 shows that the freeness drop increases with increased net energy. FIG. 4 also shows that a given freeness drop is achieved more efficiency with an increase in SEL. With reference to FIGS. 6-9, an operator has selected a set point of 530 ml for the drainage (CSF) and a tensile index of 40 Nm/g (tensile strength of paper). The quality tolerance is +/−5 ml for the drainage and +/−0.5 Nm/g for the tensile index respectively. FIG. 7 shows how the control algorithm 28 is reducing the rpm of the electric motor 102 and at the same time making small adjustments to the net specific energy. As a consequence, the amount of electrical energy used for a given quality is reduced in FIG. 8. The improved efficiency is shown in FIG. 9. Savings of up to 18% is significant and with power prices above $35 MWh, an attractive return on investments is achieved. Typical savings for the most common refiner sizes are shown in FIG. 10.

Figure 11:
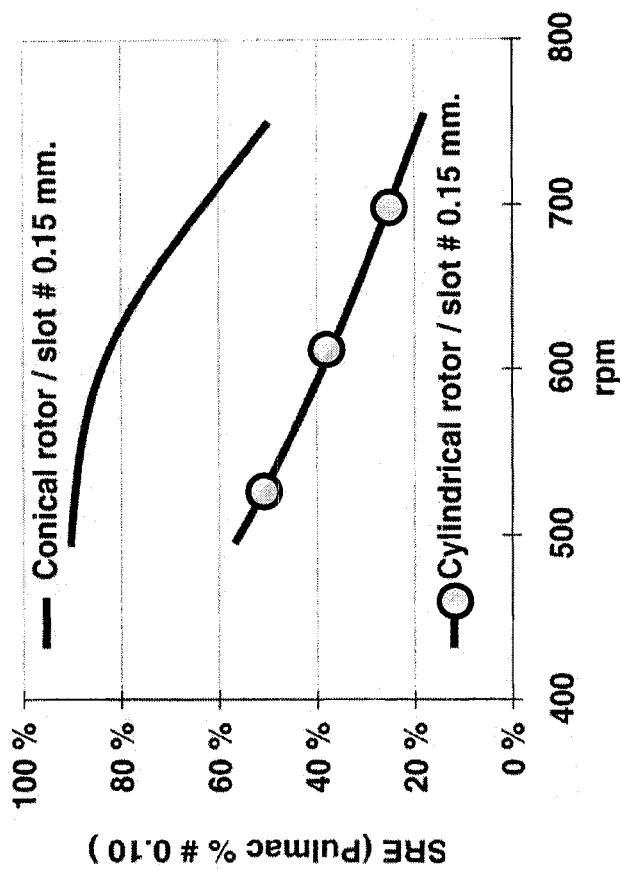
FIG. 11 is a graph illustrating typical shive removal efficiency as a function of rotational speed.

FIG. 11 illustrates shive removal efficiency as a function of rotational speed for a pressure screen. The setup of a pressure screen is virtually identical to that of the refiner. The only difference is the response variables. In a screen system, the quality improvement is achieved by improving the undeveloped fibers separation efficiency. From the professional literature it is clear that rotational speed affects the Shive Removal Efficiency (SRE). FIG. 11 further illustrates that reducing the rpm of the electric motor 102 improves the SRE. As the rpm is reduced, the capacity of the screen is reduced, and as a consequence the "balancing act" of the control algorithm 28 is to find the lowest rpm for the required capacity. The no-load for pressure screens follows equation 1.

The control algorithm 28 starts by measuring the Canadian Standard Freeness (CSF), shives, tensile index, specific edge load and other geometrical parameters in process block 32. The specific edge load is the amount of electrical energy required to grind pulp with a specific diameter of plate. The actual no-load is computed using equation 1 in process block 34. The measured CSF is compared with the set point values in decision block 36. If the measured CSF is within the set point values, then continue. If the measured CSF is not within the set point values, then compute a new speed for the electric motor in process block 38. If the new speed is less than the minimum speed in decision block 40, then continue to decision block 44. If the new speed is greater than minimum speed than compute new value of net energy in process block 42. If the measured tensile is within the set points in decision block 44, then return to process block 32. If the measured tensile is not within the set points, then compute new value of net energy in process block 46 and then return to process block 32.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method for saving power during the operation of rotating machinery, comprising the steps of:
    measuring at least one pulp property entering or exiting said rotating machinery, providing at least one of the pulp properties of freeness, shine values and fiber lengths from a pulp quality analyzer;
    supplying an electric motor of said rotating machinery with electrical current from a variable speed drive; and
    providing a control system that includes a control algorithm, said control system inputting the at least one pulp property entering or exiting said rotating machinery, said control algorithm calculating tensile index from the at least one pulp property, said control algorithm determining an efficient speed to rotate said electric motor from the tensile index, said control algorithm communicating said efficient speed to said variable speed drive.

2. The method for saving power during the operation of rotating machinery of claim 1, further comprising the step of:
    providing a pulp quality measuring device for measuring the at least one pulp property.

3. The method for saving power during the operation of rotating machinery of claim 1, further comprising the step of:
    providing at least one of the pulp properties of pressures, flows, consistency and position from an instrument.

4. The method for saving power during the operation of rotating machinery of claim 1, further comprising the step of:
    comparing the tensile index to previously established set points, calculating a new efficient speed based on the tensile index relative to said set points.

5. A method for saving power during the operation of rotating machinery, comprising the steps of:
    measuring at least one pulp property entering or exiting said rotating machinery, providing at least one of the pulp properties of freeness, shine values and fiber lengths from a pulp quality analyzer;
    supplying an electric motor of said rotating machinery with electrical current from a variable speed drive; and
    providing a control system that includes a control algorithm, said control system inputting the at least one pulp property entering or exiting said rotating machinery, said control algorithm determining an efficient speed to rotate said electric motor from the at least one pulp property, said control algorithm communicating said efficient speed to said variable speed drive, calculating tensile index in said control algorithm, comparing the tensile index to previously established set points.

6. The method for saving power during the operation of rotating machinery of claim 5, further comprising the step of:
    providing a pulp quality measuring device for measuring the at least one pulp property.

7. The method for saving power during the operation of rotating machinery of claim 5, further comprising the step of:
    providing at least one of the pulp properties of pressures, flows, consistency and position from an instrument.

8. The method for saving power during the operation of rotating machinery of claim 5, further comprising the step of:
    calculating a new efficient speed based on the tensile index relative to said set points.

9. A method for saving power during the operation of rotating machinery, comprising the steps of:
    measuring at least one pulp property entering or exiting said rotating machinery, providing at least one of the pulp properties of freeness, shine values and fiber lengths from a pulp quality analyzer;
    supplying an electric motor of said rotating machinery with electrical current from a variable speed drive; and
    providing a control system that inputs said at least one pulp property, said control system determining an efficient speed to rotate said electric motor from the at least one pulp property, said control system communicating said efficient speed to said variable speed drive;
    providing said control system with a control algorithm, said control algorithm receiving the at least one pulp property, said control algorithm calculating said efficient speed based on the at least one pulp property; and
    calculating tensile index in said control algorithm, comparing the tensile index to previously established set points.

10. The method for saving power during the operation of rotating machinery of claim 9, further comprising the step of:
    providing a pulp quality measuring device for measuring the at least one pulp property.

11. The method for saving power during the operation of rotating machinery of claim 9, further comprising the step of:
    providing at least one of the pulp properties of pressures, flows, consistency and position from an instrument.

12. The method for saving power during the operation of rotating machinery of claim 9, further comprising the step of:
    calculating a new efficient speed based on the tensile index relative to said set points.

13. The method for saving power during the operation of rotating machinery of claim 9, further comprising the step of:
    changing the speed of said electric motor by changing the frequency of the electric current supplied to said electric motor by said variable speed drive.

* * * * *